(12) United States Patent
Fujita et al.

(10) Patent No.: US 7,569,967 B2
(45) Date of Patent: Aug. 4, 2009

(54) COMPACT DISK DEVICE AND DISK DRIVE

(75) Inventors: Yuji Fujita, Kanagawa (JP); Yasuo Amano, Kanagawa (JP); Yoshihide Yamaguchi, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 459 days.

(21) Appl. No.: 11/471,037

(22) Filed: Jun. 19, 2006

(65) Prior Publication Data

US 2006/0290228 A1 Dec. 28, 2006

(30) Foreign Application Priority Data

Jun. 24, 2005 (JP) ............................. 2005-184615

(51) Int. Cl.
*H02K 3/00* (2006.01)
*H02K 3/26* (2006.01)

(52) U.S. Cl. .................... 310/208; 310/67 R; 310/180; 360/99.08

(58) Field of Classification Search ................. 310/179, 310/180, 208, 67 R; 360/99.08
See application file for complete search history.

(56) References Cited

U.S. PATENT DOCUMENTS

| | | | | |
|---|---|---|---|---|
| 6,700,282 B2 * | 3/2004 | Mori et al. | .................. | 310/208 |
| 6,770,998 B2 * | 8/2004 | Wauke | ....................... | 310/179 |
| 6,943,984 B2 | 9/2005 | Amano et al. | | |
| 6,950,276 B2 | 9/2005 | Fujita et al. | | |
| 2002/0105244 A1 * | 8/2002 | Wauke | ....................... | 310/180 |
| 2003/0227712 A1 | 12/2003 | Nakano et al. | | |

FOREIGN PATENT DOCUMENTS

| | | | |
|---|---|---|---|
| EP | 1566877 A1 * | 8/2005 | |
| JP | 2003-079119 A | 3/2003 | |
| JP | 2004-032829 | 1/2004 | |
| JP | 2004-032926 A | 1/2004 | |

\* cited by examiner

*Primary Examiner*—Renee S Luebke
*Assistant Examiner*—Jason Collins
(74) *Attorney, Agent, or Firm*—Townsend and Townsend and Crew LLP; Darren Gold

(57) ABSTRACT

A disk device has a small size, a small thickness, a high efficiency, a small degree of vibration and a small level of noise. In one embodiment, the disk device comprises a disk for storing information and a disk drive for driving the disk. The disk drive includes a rotor portion mounting an annular permanent magnet on the outer peripheral portion thereof, and a stator portion disposed on the outer side in the radial direction of the annular permanent magnet. The stator portion is constituted by a wiring board provided with a stator core formed by laminating magnetic metal plates in a radial manner and a coil that is so formed as to surround the stator core while electrically connecting wiring layers and through hole portions. The coil is so formed that among the envelopes connecting the outermost peripheral surfaces of the coil in the radial direction, the neighboring envelops and intersect at an inner position in the radial direction.

4 Claims, 8 Drawing Sheets

COMPACT DISK DEVICE AND DISK DRIVE

CROSS-REFERENCES TO RELATED APPLICATIONS

This application claims priority from Japanese Patent Application No. JP2005-184615, filed Jun. 24, 2005, the entire disclosure of which is incorporated herein by reference.

BACKGROUND OF THE INVENTION

This invention relates to a disk device and to a disk drive, such as a magnetic disk device, a flexible disk drive, a magnetic-optic disk drive, an optical disk drive, an optical hologram disk drive and a disk drive used therefore.

Conventional magnetic disk devices have been disclosed in JP-A-2003-79119 (patent document 1), JP-A-2004-32829 (patent document 2) and JP-A-2004-32926 (patent document 3). These magnetic disk devices include a magnetic disk for storing information and a disk drive for driving the magnetic disk. The disk drive includes rotor portions mounting an annular permanent magnet on the outer peripheral portion thereof, and stator portions disposed on the outer side in the radial direction of the annular permanent magnet. The stator portion is constituted by a wiring board provided with a stator core formed by laminating magnetic metal plates in a radial manner and a coil that is so formed as to surround the stator core while electrically connecting wiring layers and through holes.

BRIEF SUMMARY OF THE INVENTION

According to the above patent documents 1 to 3, the magnetic disk device can be formed having a decreased thickness. However, spaces are great among the neighboring coils causing a decrease in the performance of the disk drive and a decrease in the width of the stator core correspondingly, resulting in a decrease in the saturation of the magnetic flux density that passes through the stator core. That is, performance of the disk drive is basically greatly affected by the volume of the magnetic circuit in the stator, while spaces among the neighboring coils do not function as magnetic circuits. It is therefore important to reduce wasteful spaces among the coils as much as possible from the standpoint of enhancing performance of the disk drive.

It is a feature of the present invention to realize a disk device and a disk drive featuring a small size, a small thickness, a high efficiency, a small degree of vibration and a small level of noise by increasing the volume of the stator core by reducing as much as possible the wasteful spaces that do no work as magnetic circuits.

In accordance with a first aspect of the present invention, a disk device comprises a disk for storing information and a disk drive for driving the disk, wherein: the disk drive includes a rotor portion mounting an annular permanent magnet on the outer peripheral portion thereof, and a stator portion disposed on the outer side in the radial direction of the annular permanent magnet; and the stator portion is constituted by a wiring board provided with a stator core formed by laminating magnetic metal plates in a radial manner and a coil that is so formed as to surround the stator core while electrically connecting wiring layers and through hole portions; the coil being so formed that among the envelopes connecting the outermost peripheral surfaces of the coil in the radial direction, the neighboring envelopes intersect at an inner position in the radial direction.

Described below are specific concrete constitutions according to the first aspect of the invention.

(1) The coil is so formed that gaps among the wiring layers are widened in the radial direction thereof on the inner side of the position where the envelopes intersect each other, and the wiring layers of the other neighboring coil enter the widened portions.

(2) The stator portion is constituted by a multi-layer wiring board, and includes the coil forming a double-wound coil portion by electrically connecting the wiring layers formed in two layers over and under the stator core, respectively, to the through holes formed in a number of two on the right and left of the stator core, respectively, the coil having wiring layers on the front surface side and wiring layers on the inner side which are arranged being deviated in the radial direction in a manner that the gaps among the wiring layers on the front surface side are widened in the radial direction, and the wiring layers on the surface side of the other neighboring coil entering the widened portions.

In accordance with a second aspect of the invention, a disk drive for driving a disk comprises rotor a portion mounting an annular permanent magnet on the outer peripheral portion thereof, and a stator portion disposed on the outer side in the radial direction of the annular permanent magnet. The stator portion is constituted by a wiring board provided with a stator core formed by laminating magnetic metal plates in a radial manner and a coil that is so formed as to surround the stator core while electrically connecting wiring layers and through hole portions. The coil is so formed that among the envelopes connecting the outermost peripheral surfaces of the coil in the radial direction, the neighboring envelopes intersect at an inner position in the radial direction.

Described below is a concrete constitution according to the second aspect of the invention. The stator portion is constituted by a multi-layer wiring board, and includes the coil forming a double-wound coil portion by electrically connecting the wiring layers formed in two layers over and under the stator core, respectively, to the through holes formed in a number of two on the right and left of the stator core, respectively, the coil having wiring layers on the front surface side and wiring layers on the inner side which are arranged being deviated in the radial direction in a manner that the gaps among the wiring layers on the front surface side are widened in the radial direction, and the wiring layers on the surface side of the other neighboring coil entering the widened portions.

The present invention realizes a disk device and a disk drive featuring a small size, a small thickness, a high efficiency, a small degree of vibration and a small level of noise by increasing the volume of the stator core by reducing as much as possible the wasteful spaces that do no work as magnetic circuits.

DETAILED DESCRIPTION OF THE INVENTION

A disk drive according to an embodiment of the invention will now be described.

Figure 1:
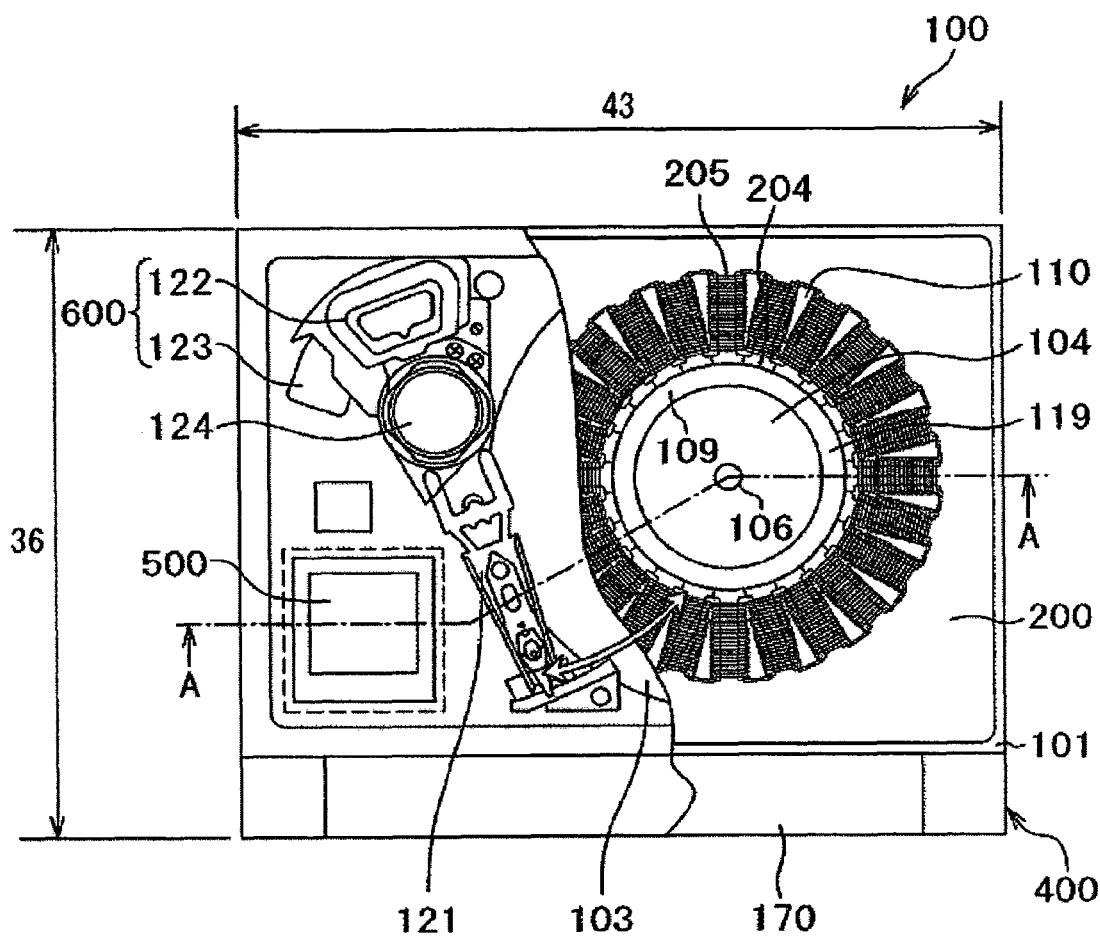
FIG. 1 is a top view of a magnetic disk device according to an embodiment of the invention in a state where a covering has been omitted.
Figure 2:
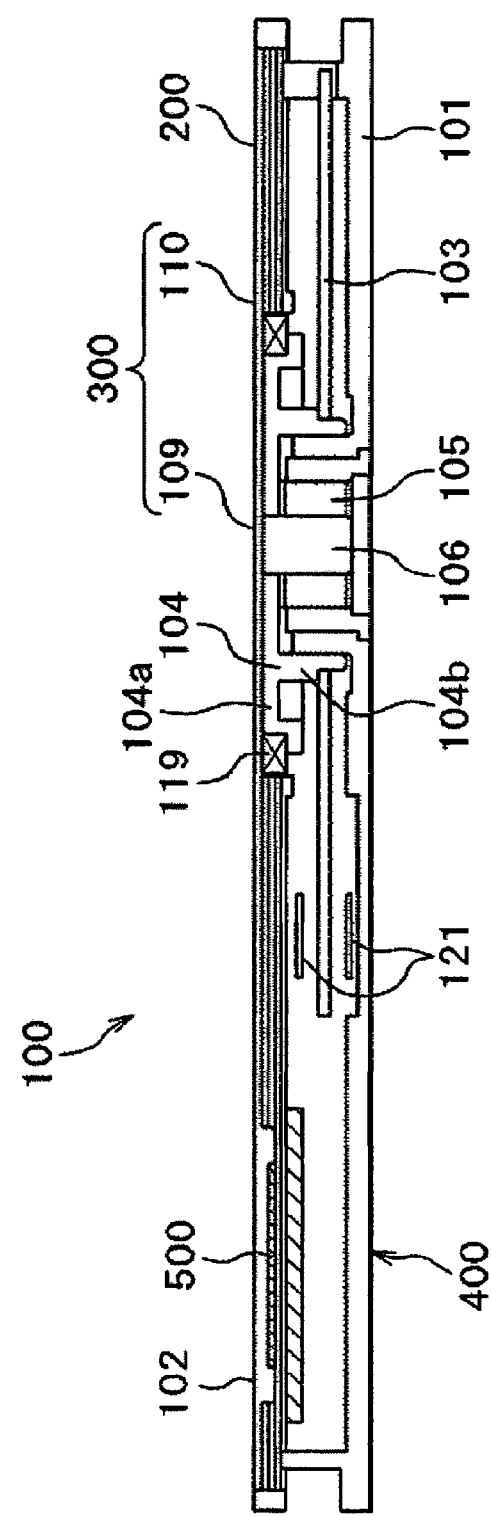
FIG. 2 is a sectional view along A-A in FIG. 1.

Described below, first, with reference to FIGS. 1 and 2 is a whole magnetic disk device 100. FIG. 1 is a top view of a magnetic disk device 100 according to an embodiment of the invention, and FIG. 2 is a sectional view along A-A in FIG. 1. Here, FIG. 1 illustrates a state where a cover 102 is omitted and a metal core substrate 200 is partly cut away.

The magnetic disk device 100 includes a magnetic disk 103, a disk drive unit 300 for driving the magnetic disk 103, a magnetic head, a suspension 121 for supporting the magnetic head, a head drive unit 600 for moving the magnetic head via the suspension 121 to bring it to a predetermined position, a control unit 500 for controlling the drive units 300, 600, and a housing 400 for incorporating them, as principal constituent elements. The magnetic disk device 100 of this embodiment has an outer size (43 mm×36 mm×3.3 mm) which is the same as the Compact Flush® memory type 1.

The disk drive unit 300 is constituted by a rotor portion 109 for fixing and rotating the magnetic disk 103, and a stator portion 110 for rotating the rotor portion 109. The housing 400 is constituted by a base 101 for supporting a shaft 106 and an oil-impregnated bearing 105, and a cover 102 mounting a metal core substrate 200.

The rotor portion 109 is constituted by the shaft 106 that becomes a center of rotation of the disk drive unit 300, a hub 104 fixed to the shaft 106, and an annular permanent magnet 119 fixed to the outer periphery of the hub 104. The shaft 106 is supported by the oil-impregnated bearing 105 fixed to the base 101. The hub 104 coupled to the shaft 106 is supported by the oil-impregnated bearing 105 in a manner to rotate, and is constituted by a disk portion 104a fixed to the upper part of the shaft 106 and a cylindrical portion 104b hanging from the disk portion 104a so as to wrap the oil-impregnated bearing 105. The annular permanent magnet 119 is fixed being fitted to the outer peripheral end of the disk portion 104a of the hub 104. The magnetic disk 103 is fixed being fitted to an outer circumference at a lower part of the cylindrical portion 104b of the hub 104. The magnetic disk 103 is arranged in parallel with the axial direction of the annular permanent magnet 119 and the stator 110, and has a decreased thickness.

The magnetic head is positioned at an end of the suspension 121 on the back side thereof. The magnetic head turns about a suspension rotary shaft 124 being driven by the head drive unit 600 constituted by a permanent magnet 123 and a voice coil motor 122, and reads or writes information while seeking on the revolving magnetic disk 103.

The stator portion 110 is formed on a portion of the metal core substrate 200. In other words, the metal core substrate 200 has a function of a core of the stator portion 110, functions of a winding and insulation, and a function of a wiring board for mounting an electronic part such as IC that constitutes a control unit 500. At an end of the metal core substrate 200, there is mounted a connector 170 forming a plurality of signal pins for transmitting and receiving electric signals and electric power to, and from, an external unit of the magnetic disk device 100.

Figure 3:
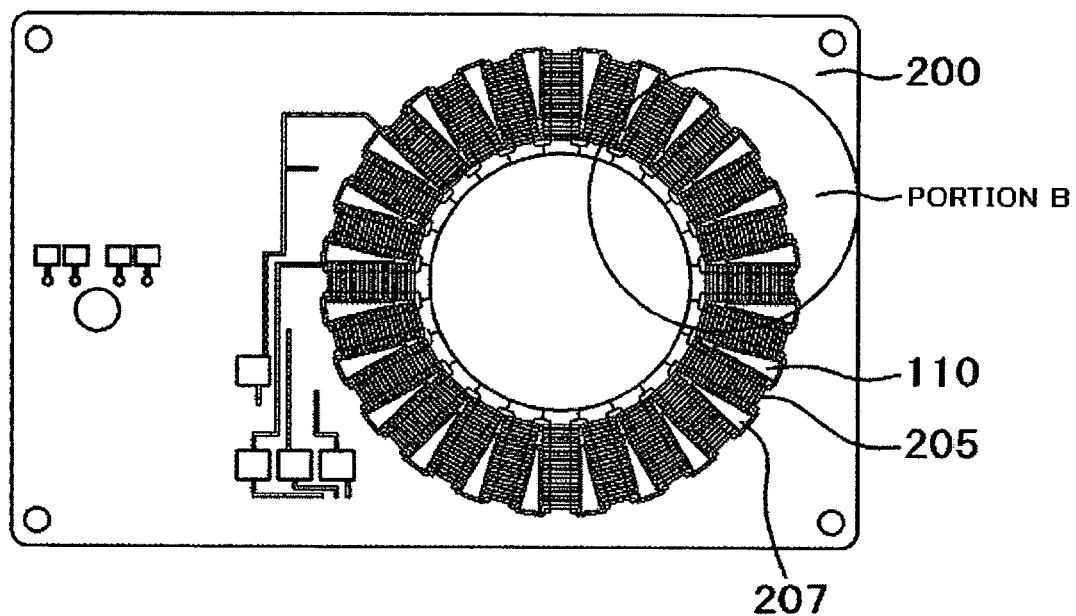
FIG. 3 is a top view illustrating the whole metal core substrate in FIG. 1.
Figure 4:
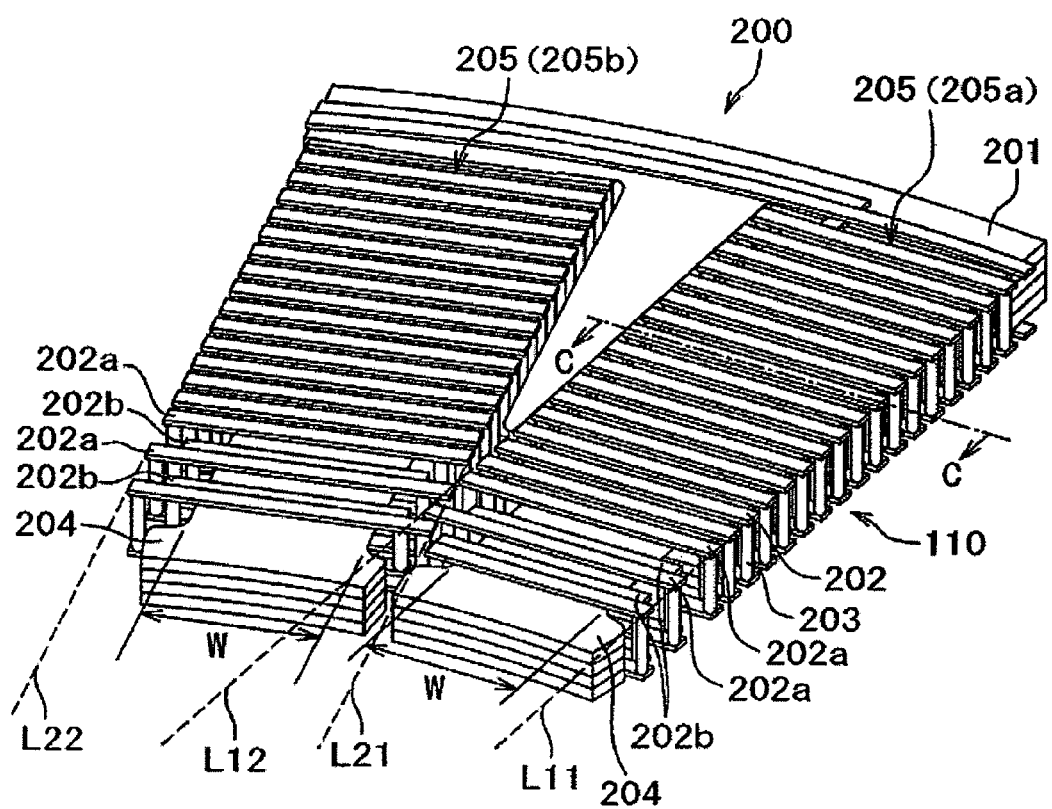
FIG. 4 is a perspective view illustrating on an enlarged scale a portion B in FIG. 3 in a state where a resin has been removed.
Figure 5:
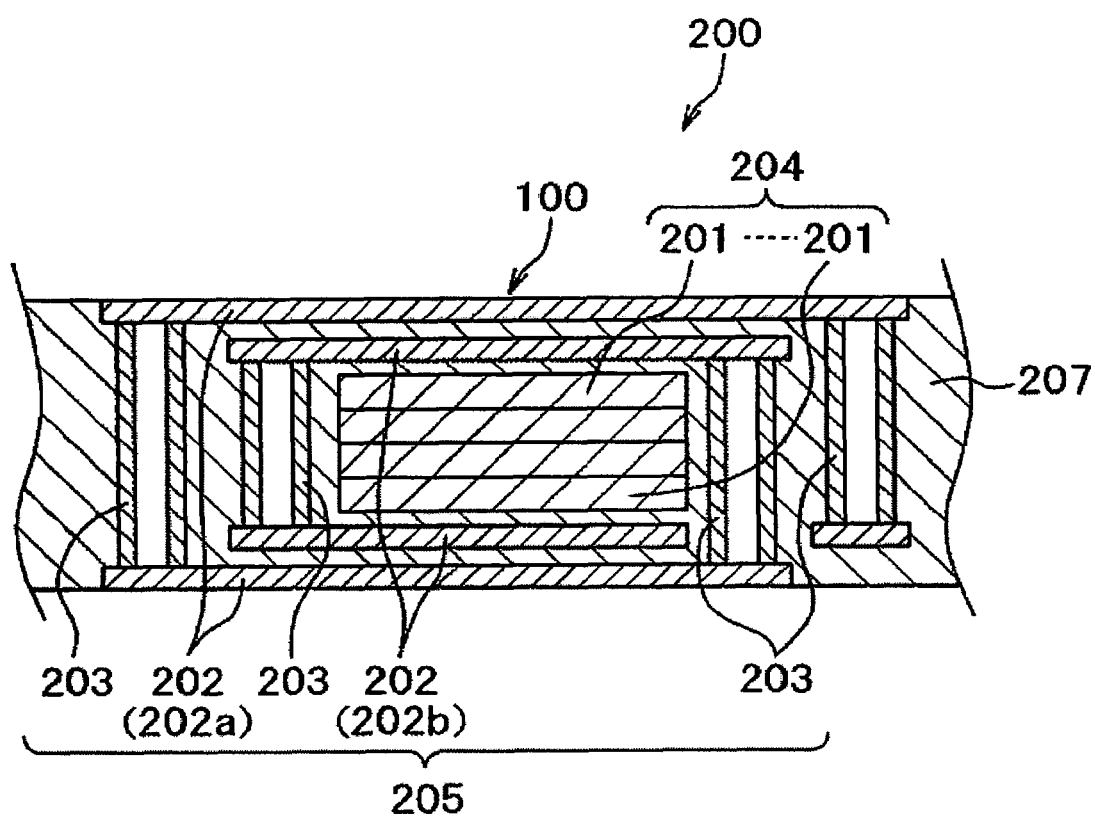
FIG. 5 is a schematic sectional view along C-C in FIG. 4.

Next, the metal core substrate 200 will be described with reference to FIGS. 3 to 5. FIG. 3 is a top view illustrating the whole metal core substrate 200 in FIG. 1, FIG. 4 is a perspective view illustrating on an enlarged scale a portion B in FIG. 3, and FIG. 5 is a schematic sectional view along C-C in FIG. 4. Here, FIG. 4 shows the coil 205 and the iron core piece 204 omitting the resin of the metal core substrate 200.

The metal core substrate 200 is formed by a multi-layer wiring substrate and, as shown in FIG. 5, is constituted by iron core pieces 204 formed by a plurality of magnetic metal plates 201, a coil 205 formed by a plurality of wiring layers 202 and a plurality of through holes 203, and an insulating material 207 which is an insulating layer. The stator portion 110 is constituted by the iron core piece 204, coil 205 and insulating material 207. The iron core pieces 204 constitute the stator core.

In forming the layers of the multi-layer wiring substrates, the magnetic metal plate 201 is formed by forming a soft magnetic material such as a thin and soft magnetic material made of a silicon steel, like a thin metal layer of the silicon steel. The core pieces 204 can be easily fabricated by laminating magnetic metal plates 201, and are of a structure that causes less iron loss for the motor as a result of using the silicon steel. The volume (sectional area) of the iron core pieces 204 can be varied depending upon the number of the layers of the magnetic metal plates 201 and the width thereof. The iron core pieces 204 are buried in the insulating material 207 as shown in FIG. 5, and are radially extending as shown in FIGS. 3 and 4. To form the stator portion 110, the iron core pieces 204 are formed in a number (24 in the illustrated embodiment) which is 1.5 times as large as the number of poles of the annular permanent magnet 119 along the circumference maintaining an equal distance.

Referring to FIG. 5, the coil 205 has a winding structure provided with a double-wound coil portion constituted by two wiring layers 202 on the upper surface side and on the lower surface side, respectively, and four through holes 203 electrically connecting the wiring layers 202 per each section. The two wiring layers 202 include a wiring layer 202a formed on the surface and a wiring layer 202b buried in the insulating material 207. The double-wound coil portion is continuously formed in the lengthwise direction of the iron core piece 204 to constitute the coil 205. The insulating material 207 is interposed among the wiring layers 202, through holes 203 and iron core pieces 204.

The thus constituted coils 205 are wound on all 24 iron core pieces 204, and are connected together by a predetermined coupling system. By flowing an electric current to these coils 205, a magnetic field is established for the annular permanent magnet 119 through the iron core pieces 204 to produce a torque for rotating the rotor portion 109.

Referring to FIG. 4, envelopes closest to the neighboring coils 205 are denoted by L11, L12, L21, L22 among the envelopes connecting the outermost peripheral surfaces of the coils 205a, 205b in the radial direction. In this embodiment, the coils 205a and 205b are so formed that the neighboring envelopes L12 and L21 of the coils 205a and 205b intersect at an inner position in the radial direction. Concretely speaking, the coils 205a and 205b are so formed that the envelope L21 connecting the outermost peripheral surfaces of the coil 205b is formed on the inside of the envelope L12 that connects the outermost peripheral surface of the coil 205a. On the inside of the position where the envelops L12 and L21 intersect as shown in FIG. 4, the wiring layers 202a on the front surface side and the wiring layers 202b on the inner side are arranged being deviated in the radial direction, and gaps are widened in the radial direction among the wiring layers 202a on the front surface side. The wiring layers 202a on the front surface side of the other neighboring coil 205a or 205b are so provided as to enter the widened portions.

By arranging the coils 205a, 205b as described above, a space between the coils 205a and 205b can be further narrowed, and a wasteful space that does not work as a magnetic circuit can be reduced as much as possible. From the standpoint of the magnetic circuit, therefore, the width W of the iron core piece 204 can be further increased making it possible to increase the torque of the spindle motor while decreasing the amount of electric power consumed by the motor.

The above metal core substrate 200 can be produced by utilizing a process for producing general printed boards. In this embodiment, a thin plate of a magnetic metal having a thickness of about 0.1 mm is worked into the shape of core pieces 204 by chemical etching or press working. Four pieces of the thin plates are adhered together, and RCC (resin coated copper) is adhered to the front and back surfaces thereof. Next, through holes are formed by drilling or by using a laser beam to form through hole portions 203. Thereafter, the inner walls of the through holes are plated with copper thereby to form through hole portions 203. Next, the surface copper foil is chemically etched to form a wiring layer 202. By repeating the above steps, a metal core substrate 200 is completed.

Figure 6:
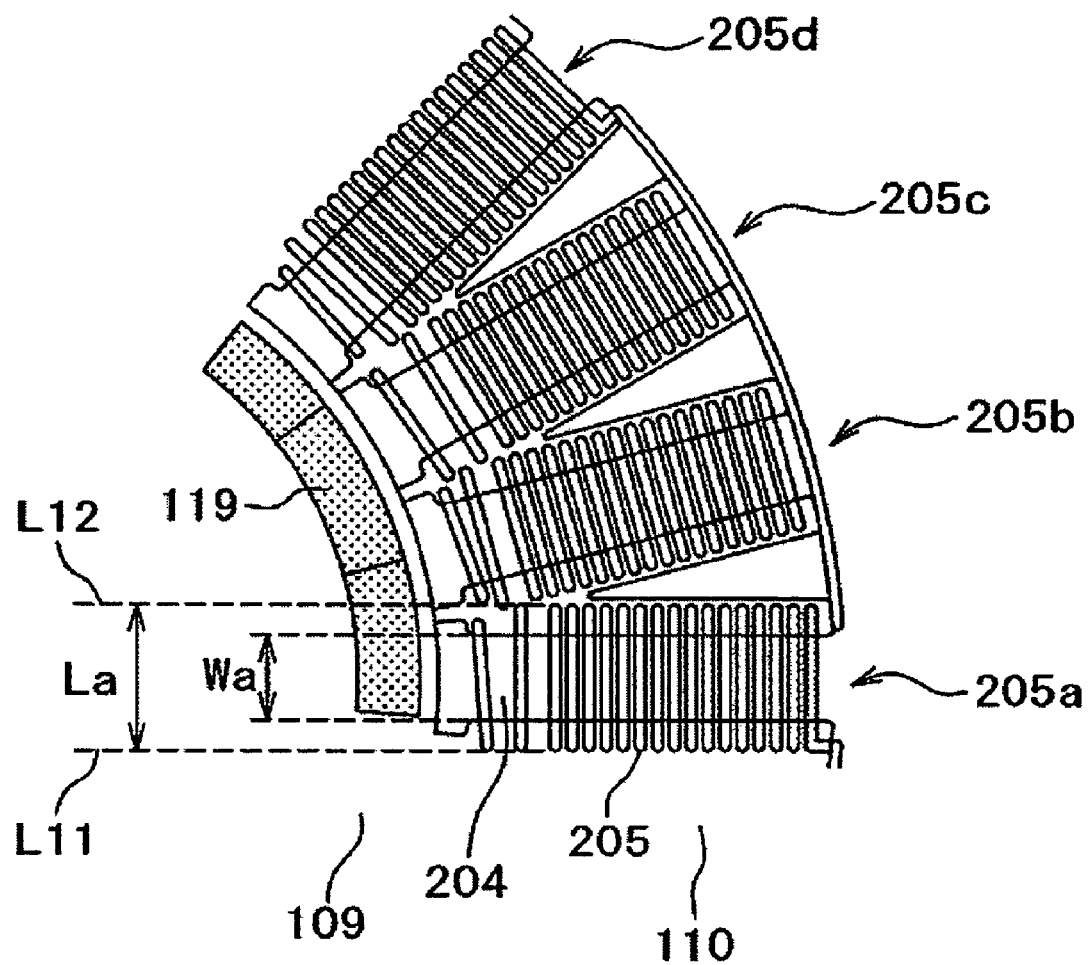
FIG. 6 is a top view illustrating portions of a rotor and a stator in the magnetic disk device according to the embodiment.

Next, the effect of this embodiment will be described in comparison with that of the conventional example with reference to FIGS. 6 to 9. FIG. 6 is a top view illustrating portions of the rotor portion 109 and the stator portion 110 in the magnetic disk device 100 according to the embodiment, FIG. 7 is a top view illustrating portions of a rotor portion 109 and a stator portion 110 in a conventional magnetic disk device, FIG. 8 is a diagram showing a waveform of a voltage induced in a spindle motor by the stator 110 shown in FIG. 6, and FIG. 9 is a diagram showing a waveform of a voltage induced in a spindle motor by a stator 110 shown in FIG. 7.

A gap between the envelops L11 and L12 connecting the outermost peripheral surfaces of the coil 205 of this embodiment is denoted by La, the width of the iron core piece 204 is denoted by Wa, and a gap between the envelops L11 and L12 connecting the outermost peripheral surfaces of the coil 205 of the conventional example is denoted by Lb and the width of the iron core piece 204 is denoted by Wb. In this embodiment shown in FIG. 6, the coils 205a and 205b are so formed that the neighboring envelopes L12 and L21 of the coils 205a and 205b intersect at an inner position in the radial direction, and the other neighboring coil 205 or 205b is permitted to enter the inside on the in inner side of the position where L12 and L21 intersect in order to reduce the wasteful volume which does not function as the magnetic circuit. In this embodiment, therefore, the space can be narrowed between the coil 205a and 205b as compared to that of the conventional example shown in FIG. 7. Accordingly, the gap La between the envelops L11 and L12 becomes greater than the gap Lb, and the width Wa of the iron core piece 204 becomes greater than Wb, as well. If the outer shape of the stator portion 110 is the same, the iron core pieces 204 can be designed to be Wa=1.233 mm and Wb=0.933 mm. Thus, Wa can be greatly increased compared to Wb.

Figure 7:
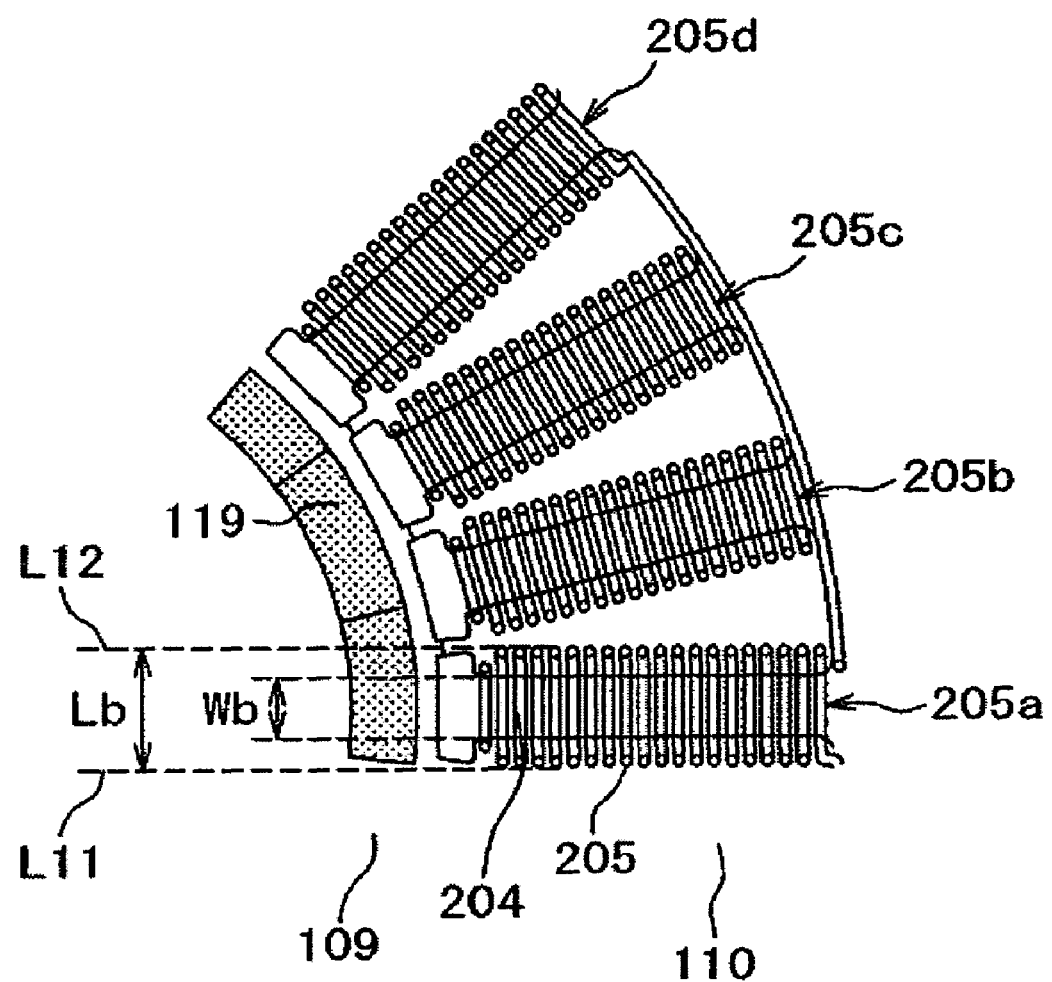
FIG. 7 is a top view illustrating portions of the rotor and the stator in a conventional magnetic disk device.

Based on the above design values, spindle motors were produced on an experimental basis by employing the two kinds of stator portions shown in FIGS. 6 and 7. It was confirmed that when a disk of a diameter of 1 inch was rotated at 3600 rpm, the consumption of electric power was 49 mW when the stator portion of FIG. 6 was used, and was 61 mW when the stator portion of FIG. 7 was used, making it possible to decrease the consumption of electric power down to about 80%.

Figure 8:
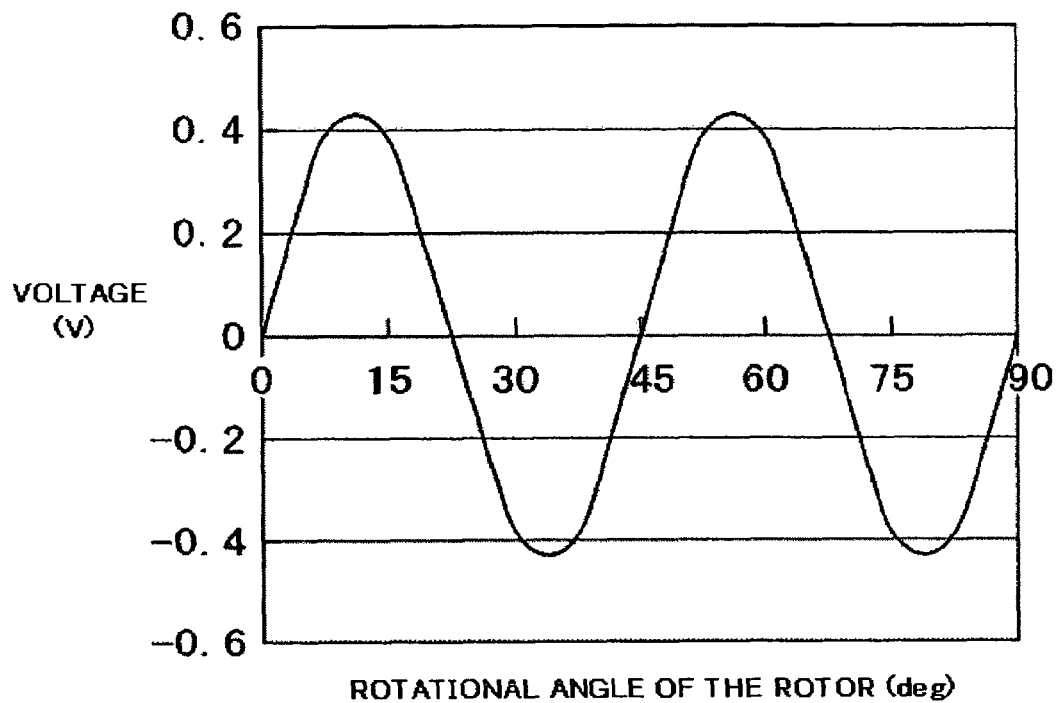
FIG. 8 is a diagram showing a waveform of a voltage induced in a spindle motor by a stator shown in FIG. 6.
Figure 9:
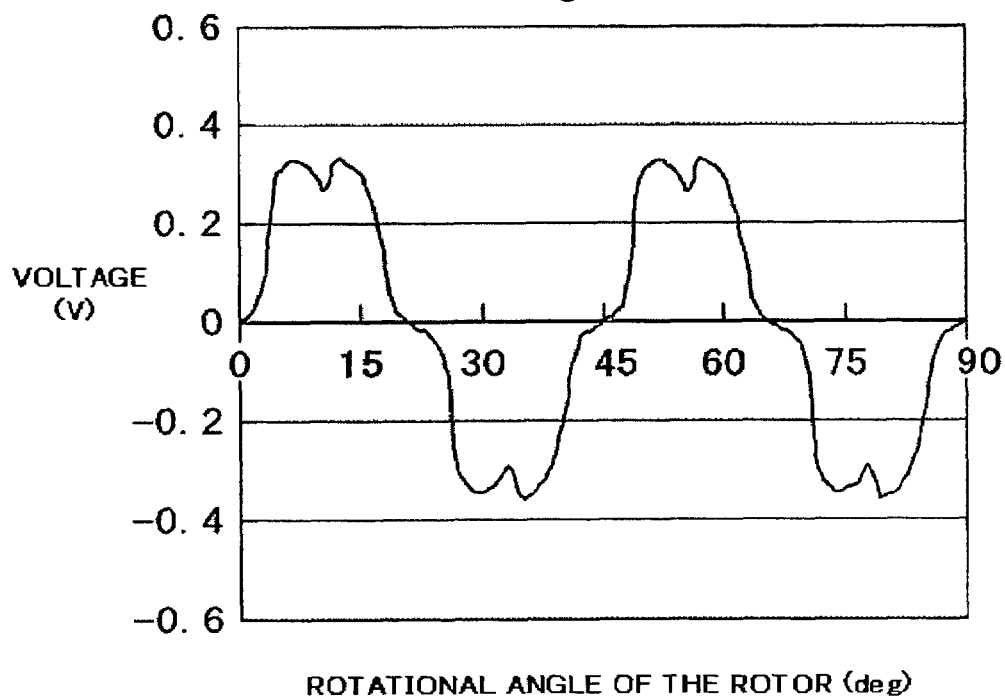
FIG. 9 is a diagram showing a waveform of a voltage induced in a spindle motor by a stator shown in FIG. 7.

It was confirmed that the waveform of a voltage induced in the spindle motor by the stator shown in FIG. 6 was close to a sinusoidal wave containing little harmonic components as shown in FIG. 8. Therefore, vibration energy was released little accompanying the rotation of the magnetic disk 103 and, hence, there was realized the disk drive 300 featuring small vibration and low noise. On the other hand, the waveform of a voltage induced in the spindle motor by the stator shown in FIG. 7 contained much harmonic components as shown in FIG. 9 and was greatly distorted. This is attributed to that the flux density penetrating through the iron core pieces 204 increases and saturates due to the narrow width Wb of the iron core pieces 204 causing a sharp change in the induced voltage. In the above conventional spindle motor, the torque varies to a large extent accompanying the rotation of the magnetic disk 103 releasing vibration energy in the form of vibration and noise.

The invention is not necessarily limited to the above embodiment only. In FIG. 4, for example, the outermost peripheral portions of the coil 205b are formed on the inside of the envelope L12. However, the same effect can be exhibited even by narrowing the gaps among the coils. That is, by arranging the coils of the inner side of the coil 205b on the inside of the envelope L12, wasteful spaces can be further reduced among the coils to further improve motor performance per the volume.

Further, the present invention is not limited to the magnetic disk device only but can, further, be applied to the storage devices that utilize the rotary disk in general, and can further be applied to a flexible disk drive, a magnetic-optic disk drive, an optical disk drive, an optical hologram disk drive and the like.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A disk device which comprises a disk for storing information and a disk drive for driving said disk, wherein:
    said disk drive includes a rotor portion mounting an annular permanent magnet on an outer peripheral portion thereof, and a stator portion disposed on the outer side in the radial direction of said annular permanent magnet;
    said stator portion is constituted by a wiring board provided with a stator core formed by laminating magnetic metal plates in a radial manner and a coil that is so formed as to surround said stator core while electrically connecting wiring layers and through hole portions; and
    said coil being so formed that among envelopes connecting the outermost peripheral surfaces of said coil in the radial direction, the envelops intersect at an inner position in the radial direction;
    wherein said coil is so formed that gaps among said wiring layers are widened in the radial direction thereof on the inner side of the position where the envelopes intersect each other, and the wiring layers of the a neighboring coil enter into the widened portions.

2. A disk device which comprises a disk for storing information and a disk drive for driving said disk, wherein:

said disk drive includes a rotor portion mounting an annular permanent magnet on an outer peripheral portion thereof, and a stator portion disposed on the outer side in the radial direction of said annular permanent magnet;

said stator portion is constituted by a wiring board provided with a stator core formed by laminating magnetic metal plates in a radial manner and a coil that is so formed as to surround said stator core while electrically connecting wiring layers and through hole portions; and said coil being so formed that among envelopes connecting the outermost peripheral surfaces of said coil in the radial direction, the envelops intersect at an inner position in the radial direction;

wherein said stator portion is constituted by a multi-layer wiring board, and includes the coil forming a double-wound coil portion by electrically connecting the wiring layers formed in two layers over and under said stator core, respectively, to the through holes formed in a number of two on the right and left of the stator core, respectively, said coil having wiring layers on a front surface side and wiring layers on an inner side which are arranged being deviated in the radial direction in a manner that the gaps among the wiring layers on the front surface side are widened in the radial direction, and the wiring layers on the surface side of the neighboring coil entering the widened portions.

3. A disk drive for driving a disk, which comprises a rotor portion mounting an annular permanent magnet on the outer peripheral portion thereof, and a stator portion disposed on the outer side in the radial direction of said annular permanent magnet;

wherein said stator portion is constituted by a wiring board provided with a stator core formed by laminating magnetic metal plates in a radial manner and a coil that is so formed as to surround said stator core while electrically connecting wiring layers and through hole portions;

said coil being so formed that among envelopes connecting the outermost peripheral surfaces of said coil in the radial direction, the neighboring envelops intersect at an inner position in the radial direction;

wherein said coil is so formed that gaps among said wiring layers are widened in the radial direction thereof on the inner side of the position where the envelopes intersect each other, and the wiring layers of a neighboring coil enter into the widened portions.

4. A disk drive according to claim 3, wherein said stator portion is constituted by a multi-layer wiring board, and includes the coil forming a double-wound coil portion by electrically connecting the wiring layers formed in two layers over and under the stator core, respectively, to the through holes formed in a number of two on the right and left of the stator core, respectively, said coil having wiring layers on a front surface side and wiring layers on an inner side which are arranged being deviated in the radial direction in a manner that the gaps among the wiring layers on the front surface side are widened in the radial direction, and the wiring layers on the surface side of the neighboring coil entering the widened portions.

\* \* \* \* \*